United States Patent Office 3,562,239
Patented Feb. 9, 1971

3,562,239
PREPARATION OF TiCl₃ COMPONENT OF OLEFIN POLYMERIZATION CATALYST
Martijn H. de Jong and Pieter van Prooijen, Rotterdam, Netherlands, assignors to Shell Oil Company, New York, N.Y., a corporation of Delaware
No Drawing. Filed June 21, 1967, Ser. No. 647,613
Claims priority, application Netherlands, June 30, 1966, 6609092
Int. Cl. C08f *3/08*
U.S. Cl. 260—93.7        7 Claims

ABSTRACT OF THE DISCLOSURE

Titanium trichloride for use as catalyst component in stereoregular olefin polymerization is prepared by gradual addition of a solution of titanium tetrachloride in inert diluent to a solution of trialkyl aluminum in inert diluent. The mixture is prepared and held at a temperature below −30° C. and most advantageously below −50° C. until addition is complete, is thereafter gradually warmed up to not above 80° C. until conversion to TiCl₃ is complete, and is then heated to an elevated temperature at which the TiCl₃ is converted to the violet form.

BACKGROUND OF THE INVENTION (1) Field of the invention

This invention relates to an improvement in the preparation of Ziegler type stereoregulating olefin polymerization catalysts.

(2) Description of the prior art

It is well known to polymerize olefins to linear polymers and specifically to polymerize propylene and certain other alpha-monoolefins to stereoregular polyolefins by contact with so-called Ziegler or Ziegler-Natta catalysts. The preferred catalysts of this type consist of the reaction products of titanium trichloride and organometallic compound of which aluminum alkyl halides and aluminum trialkyls are preferred.

It is also known to produce the titanium trichloride component of such Ziegler type catalysts by reacting titanium tetrachloride in solution with an aluminum trialkyl compound as reducing agent, and to convert such a reaction product to one in which the titanium is present in its violet form, by heating the mixture in which the titanium tetrachloride has been reduced. Such catalyst preparations are described, for example, in U.S. 2,971,925 to Winkler et al. and U.S. 3,261,821 to Vandenberg.

The reduction of TiCl₄ to TiCl₃ according to prior art methods is carried out by adding a solution of trialkyl-aluminum compound to a solution of titanium tetrachloride, the addition being ordinarily carried out at room temperature. The reaction may be completed at room temperature or at elevated temperature. The resulting brown TiCl₃ composition can be converted to the generally preferred violet form by then heating the reaction mixture, e.g., between 100° C. and 180° C.

The chemical reactions and physical transformations involved in the production of effective catalysts of the above-described type for stereoregular olefin polymerization are complex and to some extent still obscure and controversial. Some little-understood effects are involved in the relationship between catalyst preparation methods and the physical appearance of polymer produced by contact with the catalyst. Catalysts prepared according to the above-referred to methods of the prior art tend to produce polymer of excellent physical properties, but it is produced as a powdery fluff of low bulk density. If polymer of identical molecular structure were produced in the form of particles having a substantially higher bulk density, substantial economies would be effected in the manufacture and utilization of the polymers.

Advantages due to greater compactness of the polymer accrue in respect to the polymerization itself, in the working-up of the polymer, during the transportation of the finished product and in the processing thereof. If the polymer is compact the polymerization can be continued to a higher polymer concentration before the suspension containing the polymer ceases to be sufficiently mobile. This compactness also leads to an increase in the capacity of the drying units, and subsequently of the materials handling and processing equipment, for instance extruders.

It has also been found that striking features of the titanium trichloride obtained according to the invention when used as polymerization catalyst are its high activity and its stereospecificity in polymerization of propylene and higher alpha-monoolefins.

SUMMARY OF THE INVENTION

It is the primary object of this invention to provide a process for stereoregular olefin polymerization which permits production of polymer of excellent stereoregularity in good yield in the form of particles of high bulk density. This object is achieved according to this invention by providing an improvement in the method of preparing the titanium trichloride component of a Ziegler-Natta type polymerization catalyst.

According to this invention, the titanium trichloride component of the polymerization catalyst is prepared by adding a concentrated solution of titanium tetrachloride in an inert solvent at a very low temperature—below −30° C. and preferably below −50° C.—to a concentrated solution of aluminum trialkyl and allowing the mixture to react at said very low temperature. Thereafter the mixture is allowed to gradually warm to a moderate temperature—below 80° C. and preferably not above room temperature—resulting in further reaction. The mixture is finally heated to a temperature above 100° C. for a sufficient time to convert TiCl₃ therein to the violet form.

The resulting mixture is then employed in known manner as the titanium trichloride component of an olefin polymerization catalyst. Olefin is polymerized by contact with the reaction product of said mixture with an organometallic compound of a metal of Groups I to III of the Periodic Table, preferably an aluminum alkyl and most preferably aluminum diethyl chloride.

DESCRIPTION OF THE PREFERRED EMBODIMENTS

A simplified representation of the overall reactions which are believed to take place during preparation of titanium trichloride-catalyst component according to this invention is as follows:

The reduction of titanium tetrachloride with a trialkyl aluminum proceeds at very low temperatures according to the equation:

in which R=alkyl. When the temperature is raised to higher temperatures, any remaining TiCl₄ reacts as follows with dialkyl aluminum chloride:

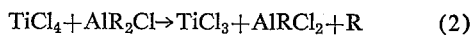

Further raising of the temperature can finally effect the reaction of any remaining TiCl₄ with alkyl aluminum dichloride:

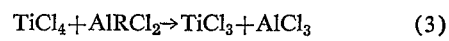

central, gravitationally descending portion of the reactive mass along the central part of the autoclave tank.

References Cited

UNITED STATES PATENTS

| | | | |
|---|---|---|---|
| 2,961,432 | 11/1960 | Fikentscher et al. | 260—87.1 |
| 2,727,884 | 12/1955 | McDonald et al. | 260—92.8 |
| 3,156,451 | 11/1964 | Waas | 259—134 |
| 3,206,287 | 9/1965 | Crawford | 260—92.8 |
| 2,673,193 | 3/1954 | Kolvoort | 260—92.8 |
| 2,717,248 | 9/1955 | Vaughn et al. | 260—92.8 |
| 2,706,108 | 4/1955 | Miner | 259—8 |
| 2,746,729 | 5/1956 | Eakins | 259—8 |

FOREIGN PATENTS

| | | | |
|---|---|---|---|
| 1,257,780 | 2/1961 | France | 260—92.8 |

OTHER REFERENCES

Seymour, H., Agitating, Stirring and Kneading Machinery, London, Ernest Benn Ltd. (1925), pp. 47 and 51.

JOSEPH L. SCHOFER, Primary Examiner

J. A. DONAHUE, JR., Assistant Examiner

U.S. Cl. X.R.

260—87.1, 87.5 tion was carried out dropwise in experiments C and 1 to 8 inclusive, and as a continuous stream (along the stirrer) in tests 9 to 12 inclusive.

The resultant suspension of $TiCl_3$ was transferred into a stainless steel reactor and electrically heated therein. In experiments 1 to 6 inclusive the temperature was brought to 155° C. within 30 minutes, and maintained at this level for 1 hour. Finally, the mixture was cooled in 15 minutes to 50° C. and diluted with 2,2,4-trimethylpentane to a concentration of 0.3 mol. of $TiCl_3/l$.

Polymerization

This was carried out in 3.5 liter reactors containing initially (in the absence of oxygen and water vapor) 2 liters of 2,2,4-trimethylpentane which had been dried through molecular sieves. The polymerization conditions were as follows:

|  | Experiments Nos. at reaction temp. | | |
| --- | --- | --- | --- |
|  | A-C, and 1-6 70° C., mmol./l. | C, 1 and 3-5 80° C., mmol./l. | 7-12 70° C., mmol./l. |
| $TiCl_3$ concentration | 4 | 2.5 | 3 |
| $AlEt_2Cl$ concentration | 6 | 4 | 6 |

Propylene, likewise carefully dried through molecular sieves, was introduced. 5% of this propylene was drawn off again. In some experiments hydrogen was present.

The pressure was 2 kg./cm.$^2$ (superatmospheric pressure).

On each occasion the polymerization was terminated after 4 hours. The polymer suspension was then transferred to a reactor containing 100 ml. of sec. butanol in which hydrogen chloride gas had been dissolved to a concentration of 10%. The polymer was subsequently separated off, washed twice with a 1% solution in HCl in water and subsequently twice with water, stream-treated to remove volatile admixtures, filtered and dried under nitrogen at 65° C. and a pressure of 16 cm. Hg.

The attached table shows the various conditions and the properties of the polymer in each case.

The catalyst activity is evaluated from the quantity of polymer produced. The degree stereospecificity is higher as the percentage of material extractable with ether is lower.

Experiments B and 2 were carried out at identical conditions of catalyst preparation and polymerization except for the fact that the $AlEt_3$ component was added to the $TiCl_4$ component in Experiment B and this order of addition was reversed in Experiment 2. It is seen that using the $TiCl_3$ component of Experiment 2, prepared according to this invention, resulted in a somewhat higher conversion rate to a polymer of significantly lower content of ether extractables and greatly increased bulk density.

On comparing Experiment 1 with Experiment 2, it is seen that catalyst produced from $TiCl_3$ prepared according to this invention by addition of catalyst components at −51° C. results in somewhat lower conversion rates to polymer of somewhat higher ether extractables content and significantly lower bulk density. Comparing the results of Experiment 1 with Experiment B further demonstrates that catalyst made from $TiCl_3$ produced according to this invention by addition of catalyst components at −51° C. results in production of polymer of substantially lower ether extractables content and substantially higher bulk density than polymer produced from catalyst utilizing $TiCl_3$ prepared at −70° C. by addition of the $AlEt_3$ component to the $TiCl_4$ component.

Within the scope of the invention the table indicates that preference should be given to the ratio of Al to Ti of 1.15:3, dropwise addition of $TiCl_4$ and gradual heating to 155° C.

| | Catalyst preparation | | | | | | |
| --- | --- | --- | --- | --- | --- | --- | --- |
| No. | Temperature 1st stage °C. | $AlEt_3$ concentration, mol/l. | $TiCl_4$ concentration, mol/l. | Addition time hrs. | Method of addition | Molar ratio Al/Ti 1st stage | Progress of heating |
| A | −30 | 0.85 | 2 | 2 | (1) | 1.15:3 | Rapid |
| B | −70 | 0.85 | 2 | 2 | (1) | 1.15:3 | Do. |
| 1 | −51 | 0.85 | 2 | 2 | | 1.15:3 | Do. |
| 2 | −70 | 0.85 | 2 | 2 | | 1.15:3 | Do. |
| 3 | −70 | 0.85 | 2 | 8 | | 1.15:3 | Do. |
| 4 | −70 | 0.85 | 4 | 4 | (2) | 1.15:3 | Do. |
| 5 | −70 | 0.85 | 2 | 4 | | 1.15:1 | Do. |
| 6 | −70 | 1.6 | 2 | 4 | | 1.15:3 | Do. |
| 7 | −70 | 0.8 | 2 | 4 | | 1.15:3 | Stepwise. |
| 8 | −70 | 0.8 | 2 | 4 | | 1.15:3 | Do. |
| 9 | −70 | 0.8 | 2 | 4 | | 1.15:3 | Do. |
| 10 | −70 | 0.8 | 2 | 4 | (3) | 1.15:3 | Do. |
| 11 | −70 | 0.8 | 2 | 4 | | 1.05:3 | Do. |
| 12 | −70 | 0.8 | 2 | 4 | | 1.30:3 | Do. |

| | Polymerization | | | | | | | |
| --- | --- | --- | --- | --- | --- | --- | --- | --- |
| | $H_2$ in gaseous phase vol. percent | Grams of polymer per g. of $TiCl_3$ per atm. of propylene per hour | | Melt Index g. per 10 min. | | Ether extract percent by wt. | | Bulk density, g/ml. | |
| No. | | 70° C. | 80° C. | 70° C. | 80° C. | 70° C. | 80° C. | 70° C. | 80° C. |
| A | | 26 | | 0.19 | | 2.3 | | 0.19 | |
| B | | 30 | | 0.10 | | 2.4 | | 0.23 | |
| 1 | | 28 | 42 | 0.17 | 0.73 | 1.3 | 2.5 | 0.29 | 0.28 |
| 2 | | 35 | | 0.16 | | 0.7 | | 0.34 | |
| 3 | | 31 | 40 | 0.16 | 0.16 | 1.2 | 1.7 | 0.32 | 0.31 |
| 4 | | 26 | 57 | 1.5 | 1.3 | 1.9 | 3.6 | 0.33 | 0.32 |
| 5 | | 34 | 49 | <0.05 | 0.36 | 1.8 | 3.8 | 0.33 | 0.31 |
| 6 | | 41 | | 0.1 | | 1.3 | | 0.33 | |
| 7 | | 32 | | 0.9 | | 1.0 | | 0.35 | |
| 8 | 0.75 | 47 | | 5.7 | | 1.5 | | 0.38 | |
| 9 | | 40 | | 0.78 | | 1.0 | | 0.34 | |
| 10 | 0.70 | 49 | | 5.7 | | 1.3 | | 0.35 | |
| 11 | 0.75 | 48 | | 9.1 | | 1.5 | | 0.33 | |
| 12 | 0.75 | 42 | | 6.8 | | 1.5 | | 0.34 | |

[1] $AlEt_3$ dropwise to $TiCl_4$.
[2] $TiCl_4$ dropwise to $AlEt_3$.
[3] $TiCl_4$ stream to $AlEt_3$.

What is claimed is:

1. The method of producing a titanium trichloride composition adapted to be used as catalyst component in the polymerization of alpha-monolefins which comprises gradually adding titanium tetrachloride in inert liquid diluent to trialkyl aluminum in inert liquid diluent in a mole ratio in the range from 3:0.9 to 3:1.5, while maintaining the mixture at a temperature in the range below $-30°$ C. and not below $-90°$ C. but above the freezing point of the mixture until the addition has been completed, thereafter gradually warming the mixture, maintaining it below 80° C. until reaction is substantially complete, and thereafter heating the mixture and maintaining it at a temperature above 80° C. until $TiCl_3$ is converted to violet gamma $TiCl_3$.

2. The method according to claim 1 in which the temperature at which reaction initially takes place is in the range below $-50°$ C. and not below $-90°$ C.

3. The method according to claim 1 in which the addition of titanium tetrachloride is effected dropwise over a period of at least one hour.

4. The method according to claim 1 in which the aluminum trialkyl is aluminum triethyl.

5. A process for polymerizing propylene to stereoregular polypropylene having a bulk density of at least about 0.30 g./ml. which comprises contacting propylene in liquid phase at propylene polymerization conditions with a catalyst consisting essentially of the reaction product of a catalyst component prepared according to the method of claim 4 with aluminum diethyl chloride in a molar ratio of 1:0.5 to 1:10.

6. The method according to claim 4 in which said temperature below $-30°$ C. is $-70°$ C.

7. A process for polymerizing propylene to stereoregular polypropylene having a bulk density of at least about 0.30 g./ml. which comprises contacting propylene in liquid phase at propylene polymerization conditions with a catalyst consisting essentially of the reaction product of a catalyst component prepared according to the method of claim 6 with aluminum diethyl chloride in a molar ratio of 1:0.5 to 1:10.

References Cited

UNITED STATES PATENTS

| | | | |
|---|---|---|---|
| 3,227,700 | 1/1966 | Natta et al. | 260—93.7 |
| 3,261,821 | 7/1966 | Vandenberg | 260—93.7 |
| 3,388,076 | 2/1970 | Lamborn | 252—429 |

JAMES A. SEIDLECK, Primary Examiner

R. A. GAITHER, Assistant Examiner

U.S. Cl. X.R.

23—87; 252—429; 260—88.2, 93.5, 94.3, 94.9